(12) United States Patent
Ellerhorst

(10) Patent No.: US 11,780,682 B2
(45) Date of Patent: Oct. 10, 2023

(54) ROLLER ASSEMBLY FOR SINGULATOR

(71) Applicant: Crown Plastics Co., Harrison, OH (US)

(72) Inventor: Peter Ellerhorst, Harrison, OH (US)

(73) Assignee: Crown Plastics Co., Harrison, OH (US)

( * ) Notice: Subject to any disclaimer, the term of this patent is extended or adjusted under 35 U.S.C. 154(b) by 0 days.

(21) Appl. No.: 17/675,375

(22) Filed: Feb. 18, 2022

(65) Prior Publication Data
US 2022/0281692 A1 Sep. 8, 2022

Related U.S. Application Data

(60) Provisional application No. 63/156,623, filed on Mar. 4, 2021.

(51) Int. Cl.
B65G 47/28 (2006.01)
B65G 39/04 (2006.01)
B65G 47/00 (2006.01)

(52) U.S. Cl.
CPC .................................. B65G 47/28 (2013.01)

(58) Field of Classification Search
None
See application file for complete search history.

(56) References Cited

U.S. PATENT DOCUMENTS

| | | | | |
|---|---|---|---|---|
| 2,254,501 A * | 9/1941 | Solem | ................... | B65G 39/07 144/250.1 |
| 2,761,547 A * | 9/1956 | Gehrer | ................... | B65G 39/02 198/780 |
| 3,054,163 A * | 9/1962 | Lakin | ................... | B65G 39/04 56/DIG. 1 |
| 3,847,260 A * | 11/1974 | Fowler | ................... | B65G 39/04 492/40 |
| 3,854,576 A * | 12/1974 | Bowman | ............... | B65G 47/268 198/781.09 |
| 4,352,230 A * | 10/1982 | Sukenik | ................... | F16C 13/00 492/42 |
| 9,221,609 B2 * | 12/2015 | Specht | ................... | B65G 39/02 |
| 9,415,944 B2 * | 8/2016 | Sozio | ................... | B65G 39/04 |
| 10,087,015 B2 * | 10/2018 | Xu | ................... | B65G 13/00 |
| 11,130,639 B2 * | 9/2021 | Rutkevicius | ........... | B65G 39/07 |
| 2008/0090687 A1 * | 4/2008 | Eck | ................... | B29C 45/14491 264/319 |

* cited by examiner

*Primary Examiner* — Kavel Singh
(74) *Attorney, Agent, or Firm* — Wood Herron & Evans LLP

(57) ABSTRACT

A roller assembly for use in a conveyor system is disclosed. The roller assembly includes a central rod having first and second ends and a longitudinal axis. The roller assembly includes a plurality of rollers rotatably mounted to the central rod such that adjacent rollers abut each other. A first shaft extends through each of the plurality of rollers and is offset from and extends parallel to the longitudinal axis of the rod, causing the plurality of rollers to rotate about the central rod in unison. A first collar and a second collar are mounted on respective first and second ends of the central rod. Each collar is selectably movable to the central rod so as to hold the plurality of rollers in a fixed position along a length of the central rod. A conveyor system with the roller assembly is also disclosed.

10 Claims, 3 Drawing Sheets

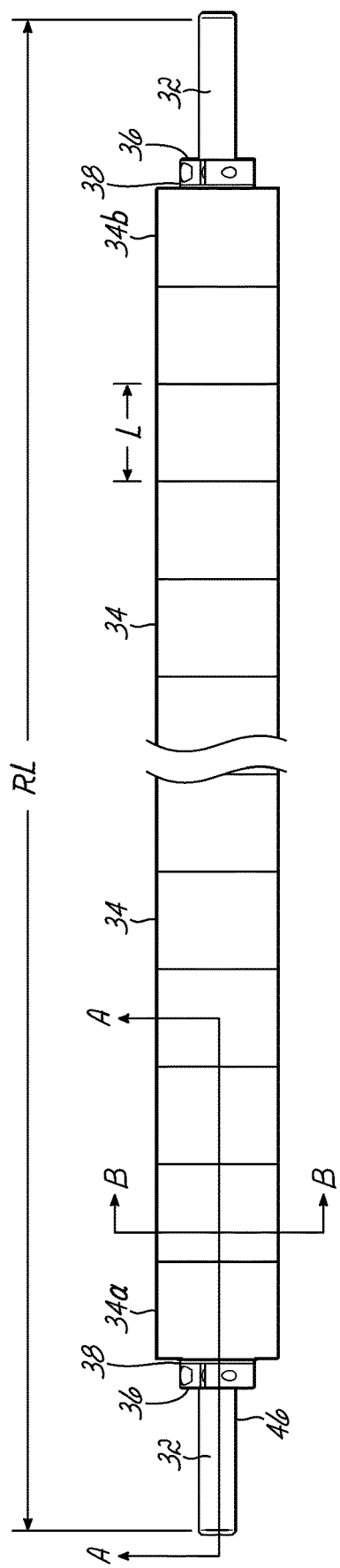
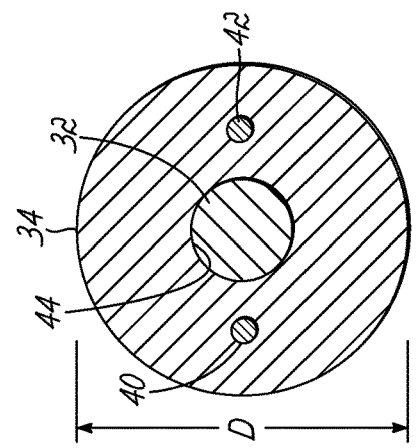
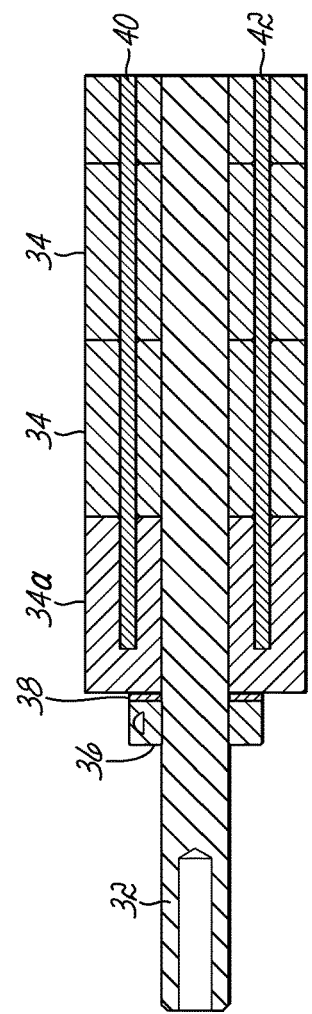
FIG. 2
FIG. 3
FIG. 4

ROLLER ASSEMBLY FOR SINGULATOR

CROSS REFERENCE TO RELATED APPLICATION

This application claims the benefit of U.S. Provisional Patent Application Ser. No. 63/156,623, filed Mar. 4, 2021, the disclosure of which is incorporated by reference herein in its entirety.

TECHNICAL FIELD

The invention relates generally to roller assemblies for a singulator in a conveyor system.

BACKGROUND

Distribution centers rely heavily on conveyor systems to transport packages throughout their warehouses or distribution centers. At any given time, an assortment of shipping containers, such as boxes, envelopes, totes, bags, etc. may be on a single conveyor at the same time. Each of those containers are typically going to different addresses and, therefore, must be organized, aligned, separated, and spaced apart so that each container may be scanned and then diverted to the proper shipping station in the warehouse. A singulator is a series of roller assemblies specifically designed to separate, space, and align containers.

Because of automation and faster line speeds, those singulator roller assemblies generate a significant amount of noise in the distribution centers. Some large shipping companies, such as FedEx and UPS, try to limit the noise level in their distribution centers to less than 85 dB. When levels go above 90 dB, then companies may violate OSHA regulations for maximum sound level exposure for workers working an eight hour day. The conveyor systems are typically a large source of noise in warehouses and distribution centers and the singulator section of the conveyor system contributes to that noise. The roller assemblies in the singulator have bearings at each end of a central support shaft. Over time, dirt and other contaminants get into the bearings, causing them to wear down and generate additional noise. As such, the noise generated by those bearings generally increases as the bearings age. Consequently, a building may initially comply with OSHA noise level guidelines, but within a year, for example, noise levels may have increased enough to violate OSHA noise level guidelines.

In addition to adding to the noise of a distribution center, those bearings also present a safety hazard. Consequently, a conveyor system using conventional bearings requires guarding so workers and their clothing will not come into contact with them and get wrapped around the bearings when the conveyor system is operating.

Because bearings degrade in the presence of dirt and other contaminants, bearings must be changed periodically. Shutting down a conveyor system to change failing bearings can be time consuming and costly as packages can no longer be transported on that down conveyor system. Also, because it is never certain when bearings might fail, the distribution center must keep up to 50 bearings or replacement roller assemblies in stock, which means a lot of money is tied up in replacement parts.

What is needed, therefore, is a roller assembly for a singulator that addresses the deficiencies of roller assemblies using conventional bearings.

SUMMARY OF THE INVENTION

To these and other ends, a roller assembly for use in a conveyor system is disclosed. The roller assembly includes a central rod having first and second ends and a longitudinal axis. The roller assembly also includes a plurality of rollers rotatably mounted to the central rod such that adjacent rollers abut each other. A first shaft extends through each of the plurality of rollers. The first shaft is offset from and extends parallel to the longitudinal axis of the rod. The first shaft is adapted to cause the plurality of rollers to rotate about the central rod in unison when the roller assembly is operational. A first collar and a second collar are mounted on respective first and second ends of the central rod. Each collar is selectably movable along the central rod so as to hold the plurality of rollers in a fixed position along a length of the central rod.

In one aspect, the roller assembly may include a second shaft extending through each of the plurality of rollers. The second shaft is offset from and extends parallel to the longitudinal axis of the central rod. Like the first shaft, the second shaft is adapted to cause the plurality of rollers to rotate about the central rod in unison when the roller assembly is operational.

In another aspect, the plurality of rollers includes a first end roller and a second end roller. The first end roller is disposed adjacent to the first end of the central rod and the second end roller is disposed adjacent to the second end of the central rod. The first shaft extends only partly through the first end roller and the second end roller.

In one aspect, each roller is made of ultra-high molecular weight plastic, wherein each roller has a center passageway that directly contacts an outer surface of the central rod. Alternatively, each roller is made of a high density polyethylene, wherein each roller has a center passageway that directly contacts an outer surface of the central rod.

In one aspect, at least one of the plurality of rollers has a center passageway with a first portion having a first diameter and a second portion having a second diameter. The first diameter is configured such that the first portion of the center passageway contacts an outer surface of the central rod and the second diameter is greater than a diameter of the central rod such that there is a gap between the second portion of the center passageway and the outer surface of the central rod.

In another embodiment, a conveyor system is disclosed. The conveyor system includes a conveyor section configured to transport items in a machine direction (MD). The conveyor section includes a singulator including a plurality of roller assemblies. Each roller assembly includes a central rod having first and second ends and a longitudinal axis. The longitudinal axis of the central rod is angled relative to the machine direction (MD) of the conveyor section. A plurality of rollers are rotatably mounted to the central rod such that adjacent rollers abut each other. A first shaft extends through each of the plurality of rollers. The first shaft is offset from and extends parallel to the longitudinal axis of the rod. The first shaft is adapted to cause the plurality of rollers to rotate about the central rod in unison when the roller assembly is operational. A first collar and a second collar are mounted on respective first and second ends of the central rod. Each collar is selectably movable to the central rod so as to hold the plurality of rollers in a fixed position along a length of the central rod.

In one aspect of the conveyor system, the roller assembly may include a second shaft extending through each of the plurality of rollers, the second shaft being offset from and extending parallel to the longitudinal axis of the rod, the second shaft is adapted to cause the plurality of rollers to rotate about the central rod in unison when the roller assembly is operational.

In another aspect of the conveyor system, the plurality of rollers includes a first end roller and a second end roller. The first end roller being disposed adjacent to the first end of the central rod and the second end roller being disposed adjacent to the second end of the central rod. The first shaft extends only partly through the first end roller and the second end roller.

In another aspect of the conveyor system, each roller is made of ultra-high molecular weight plastic, wherein each roller has a center passageway that directly contacts an outer surface of the central rod. Alternatively, each roller is made of a high density polyethylene, wherein each roller has a center passageway that directly contacts an outer surface of the central rod.

In another aspect of the conveyor system, at least one of the plurality of rollers has a center passageway with a first portion having a first diameter and a second portion having a second diameter. The first diameter is configured such that the first portion of the center passageway directly contacts an outer surface of the central rod and the second diameter is greater than a diameter of the central rod such that there is a gap between the second position of the center passageway and the outer surface of the central rod.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

FIG. 2 is a plan view of the roller assembly of the FIG. 1.

FIG. 3 is a cross-sectional view of the roller assembly of FIG. 2 taken along line A-A.

FIG. 4 is a cross-sectional view of the roller assembly of FIG. 2 taken along line B-B.

DETAILED DESCRIPTION OF THE INVENTION

Figure 1:
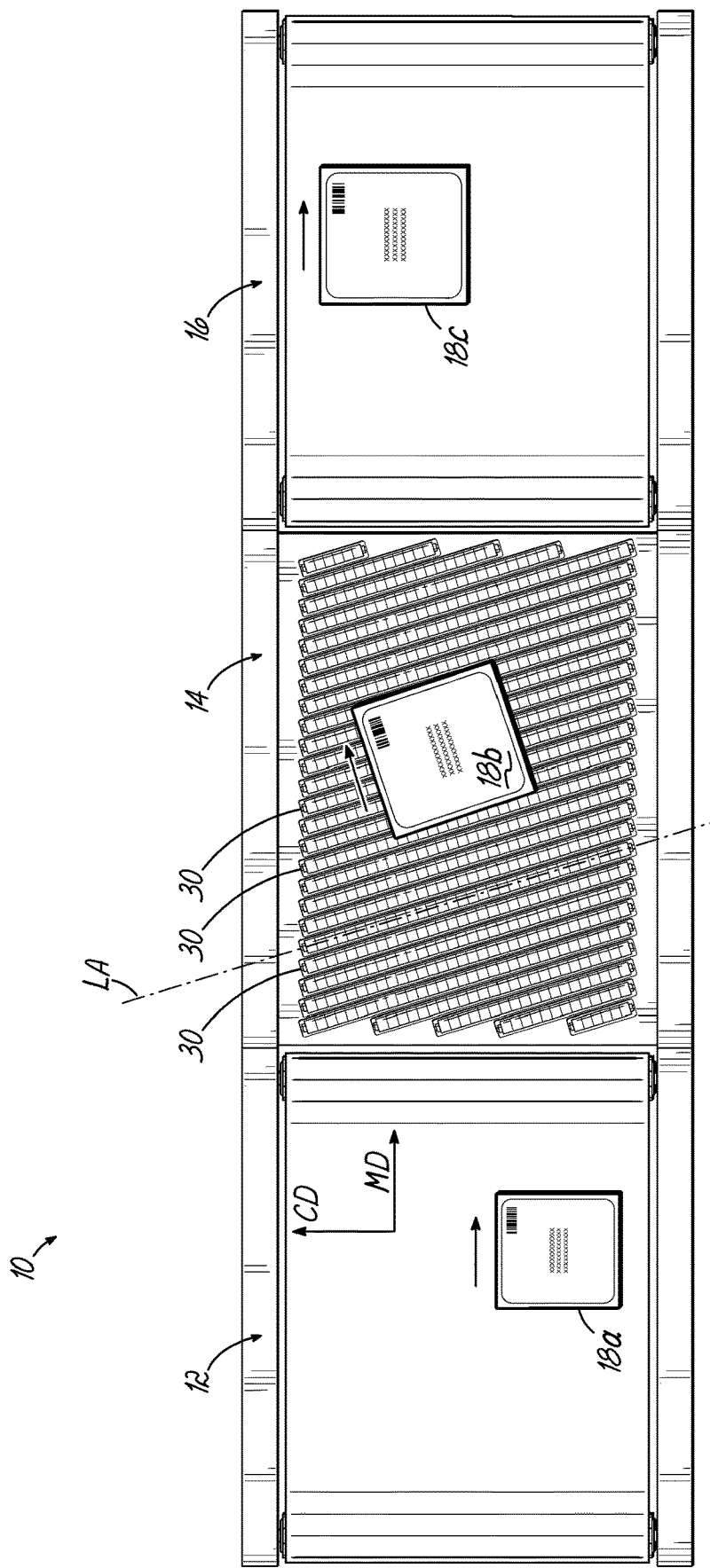
FIG. 1 is a perspective view of a conveyor system with a singulator having a roller assembly according to one embodiment of the invention.

FIG. 1 depicts an exemplary conveyor system 10 that includes a first conveyor section 12, a singulator section 14, a second conveyor section 16, and items/packages 18a, 18b, 18c at different positions and moving along the conveyor system 10 as indicated by the arrows. The particular singulator 12 shown in FIG. 1 repositions the packages 18a, 18b, 18c from one side of the conveyor system 10 to the other side. Other singulator configurations are possible depending upon what actions are to be taken on the packages 18a, 18b, 18c as they move generally downstream in the machine direction (MD) of the conveyor system 10. The singulator section 14 includes a plurality of roller assemblies 30 according to an embodiment of the invention. As depicted in FIG. 1, each roller assembly 30 has a longitudinal axis (LA) and each roller assembly 30 is arranged so that its longitudinal axis (LA) is angled relative to the cross-machine direction (CD) of the conveyor system 10. In other words, the longitudinal axis (LA) of each roller assembly 30 is not parallel to the CD of the conveyor system 10. Because of the angled configuration of the plurality of roller assemblies 30, some of the roller assemblies 30 are not as long as the other full-length roller assemblies 30.

With reference to FIGS. 2-4, an embodiment of the roller assembly 30 from the singulator section 14 is depicted. The roller assembly 30 includes a central rod 32 and a plurality of rollers 34, which are held in position along the central rod 32 by collars 36 disposed on either end of the central rod 32. As depicted in FIG. 2, the ends of adjacent rollers 34 abut each other such that there is essentially no space between those adjacent rollers 34. In an embodiment, the central rod 32 may be chrome or polished chrome or any suitable low-friction finish. Washers 38 may be disposed between each collar 36 and the two end rollers 34a, 34b. The rollers 34 may be repositioned along the central rod 32 or removed from the central rod 32 by loosening the collars 36, such as by unscrewing a set screw (not shown), and sliding the collars 36 and the rollers 34 to the new position along the central rod 32 or removing one or more of the rollers 34 from the central rod 32. The set screw may be re-tightened to secure the collars 36 to the central rod 32 thereby holding the rollers 34 in the new position.

Each roller 34 has a length (L) ranging from between 1 inch and 5 inches. In a given embodiment, each roller 34 in the roller assembly 30 may have generally the same length. For example, in one embodiment, the length of the roller 34 may be 2 inches. In another embodiment, the length of the roller 34 may be 4 inches. In other embodiments, however, a combination of shorter and longer rollers 34 may be used in the roller assembly 30. Each roller 34 may have an outside diameter (D) from between 1 inch and 6 inches, and preferably an outside diameter of around 2.5 inches.

In an embodiment, a first shaft 40 and a second shaft 42 extend through each one of the plurality of rollers 34. The first and second shafts 40, 42 are spaced away (i.e., offset, from and extend parallel to the longitudinal axis LA of the central rod 32). The first and second shafts 40, 42 serve to rotationally join the individual rollers 34 together so that the rollers 34 rotate in unison, not as individual rollers 34, about the central rod 32. In an embodiment and as depicted in FIG. 3, the first and second shafts 40, 42 do not extent the full length of the end rollers 34a, 34b, so as to not expose the ends of the first and second shafts 40, 42.

In one embodiment, the central rod 32 may have length (RL) in the range of 28 inches-100 inches, and preferably in the range of 75 inches to 85 inches. As such the number of rollers 34 on a particular roller assembly 30 may range from 10 to 46, assuming a 2 inch length of each roller 34, for example. In one embodiment the roller 34 may be a single unitary piece that extends nearly the entire length of the central rod 32. With this embodiment, first and second shafts 40, 42 would not be required.

The rollers 34, end rollers 34a, 34b, and washers 38 may be made from ultra-high molecular weight (UHMW) plastic, high-density polyethylene (HDPE), nylon, Delrin™, or acetal (polyoxymethylene or POM). In one embodiment, UHMW plastic rollers 34 and end rollers 34a, 34b are installed on the central rod 32 such that a center passageway 44 of each roller 34, 34a, 34b directly contacts an outer surface 46 of the central rod 32. In other words, there is no separate bearing between the rollers 34, 34a, 34b and the central rod 32. In this configuration, the UHMW rollers 34, 34a, 34b experience very little friction as it rotates around the central rod 32, especially when the outer surface 46 of the central rod 32 is chrome or polished chrome or some other low-friction surface.

The roller assembly 30 of the invention generates significantly less noise than a roller assembly using conventional metallic rollers with bearings. First, UHMW is a very good sound dampening material. Thus, when packages 18, 18b, 18c contact the UHMW rollers 34, 34a, 34b as they move through the conveyor system 10, those rollers 34 make significantly less noise compared to a conveyor system using metallic rollers. Second, the roller assembly 30 does not use any bearings, which may be a significant source of operational noise. Consequently, the roller assembly 30 is quieter than a conventional roller assembly using bearings. Moreover, because there are no bearings in roller assembly 30, the roller assembly 30 does not get noisier as it ages.

It is expected that rollers 34, 34a, 34b will last at least 2-3 times longer (if not longer) than a conventional roller with a bearing because the rollers 34, 34a, 34b do not need a bearing to operate. When bearings fail on a conventional roller, the bearings must be replaced or the entire roller/bearing combination. If the roller 34, 34, 34b does wear out, replacing it is a simple process taking less time to replace than a conventional roller/bearing combination. Because the rollers 34, 34a, 34b are expected to last so much longer, a conveyor system operator need not stock as many replacement rollers 34, 34a, 34b compared to the large number of conventional roller/bearing combinations that need to be stocked.

Figure 5A:
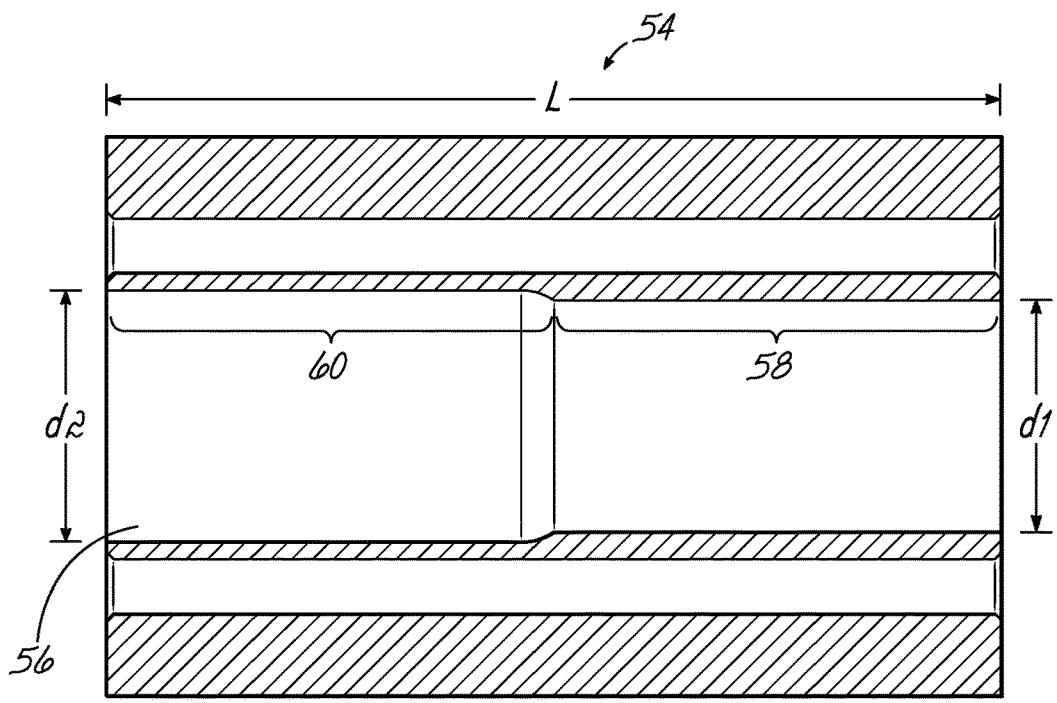
FIG. 5A is a cross-sectional view of a modified roller used in the roller assembly of FIG. 1.
Figure 5B:
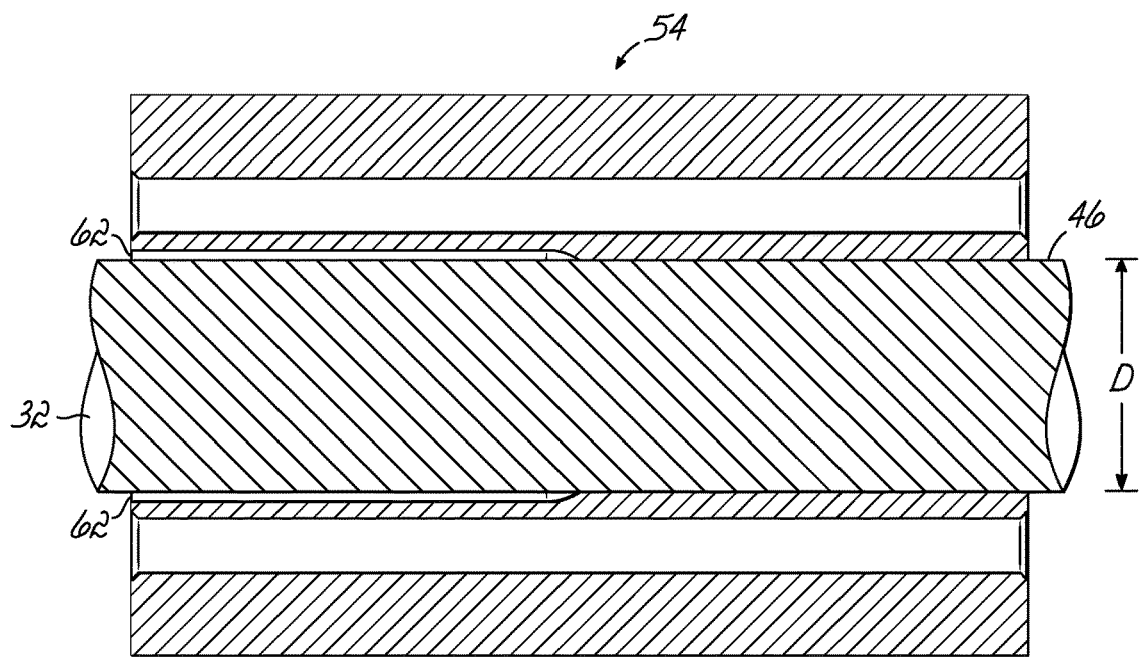
FIG. 5B is a cross-sectional view of the roller of FIG. 5A with a central rod shown therein.

A roller 54 that is a slightly modified version of the roller 34 is depicted in FIG. 5A. The configuration of roller 54 may be used for any length (L) of the roller 54, but is generally intended for use where the length (L) of roller 54 is 4 inches or more. The roller 54 has a center passageway 56 with a first portion 58 with a first diameter (d1) and a second portion 60 and with a second diameter (d2). The first diameter (d1) is selected such that the first portion 58 of the center passageway 56 contacts the outer surface 46 of the central rod 32. In contrast, the second diameter (d2) is larger than the diameter (D) of the central rod 32 so as to form a gap 62 (FIG. 5B) between the center passageway 56 and the outer surface 46 of the central rod 32. That is, because of the gap 62, the second portion 60 of the central passageway does not contact the central rod 32. The roller 54 should turn more freely about the central rod 32 because the second portion 60 does not contact the central rod 32 and, therefore, experiences less frictional resistance. In an embodiment, the first portion 58 and the second portion 60 are each approximately one half of the length (L) of roller 54. For clarity, the first and second shafts 40, 42 are not shown in the roller 54 depicted in FIG. 5B, but would otherwise be present in the operational roller assembly 30 using rollers 54.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A roller assembly for use in a conveyor system comprising:
    a central rod having first and seconds ends and a longitudinal axis;
    a plurality of rollers rotatably mounted to the central rod such that adjacent rollers abut each other;
    a first shaft extending through each of the plurality of rollers, the first shaft being offset from and extending parallel to the longitudinal axis of the central rod, whereby the first shaft is adapted to cause the plurality of rollers to rotate about the central rod in unison; and
    a first collar and a second collar mounted on respective first and second ends the central rod, each collar being selectably movable along the central rod so as to hold the plurality of rollers in a fixed position along a length of the central rod,
    wherein the plurality of rollers includes a first end roller and a second end roller, the first end roller being disposed adjacent to the first end of the central rod and the second end roller being disposed adjacent to the second end of the central rod, wherein the first shaft extends only partly through the first end roller and the second end roller.

2. The roller assembly of claim 1, further comprising a second shaft extending through each of the plurality of rollers, the second shaft being offset from and extending parallel to the longitudinal axis of the central rod, the second shaft is adapted to cause the plurality of rollers to rotate about the central rod in unison.

3. The roller assembly of claim 1, wherein each of the plurality of rollers is made of ultra-high molecular weight plastic, wherein each of the plurality of rollers has a center passageway that directly contacts an outer surface of the central rod.

4. The roller assembly of claim 1, wherein each of the plurality of rollers is made of a high density polyethylene, wherein each of the plurality of rollers has a center passageway that directly contacts an outer surface of the central rod.

5. A conveyor system comprising;
    a conveyor section configured to transport items in a machine direction MD, the conveyor section includes a singulator including a plurality of roller assemblies, each roller assembly including:
        a central rod having first and seconds ends and a longitudinal axis, the longitudinal axis of the central rod being angled relative to the machine direction MD of the conveyor section;
        a plurality of rollers rotatably mounted to the central rod such that adjacent rollers abut each other;
        a first shaft extending through each of the plurality of rollers, the first shaft being offset from and extending parallel to the longitudinal axis of the central rod, whereby the first shaft is adapted to cause the plurality of rollers to rotate about the central rod in unison; and
        a first collar and a second collar mounted on respective first and second ends the central rod, each collar being selectably movable to the central rod so as to hold the plurality of rollers in a fixed position along a length of the central rod,
    wherein the plurality of rollers includes a first end roller and a second end roller, the first end roller being disposed adjacent to the first end of the central rod and the second end roller being disposed adjacent to the second end of the central rod, wherein the first shaft extends only partly through the first end roller and the second end roller.

6. The conveyor system of claim 5, further comprising a second shaft extending through each of the plurality of rollers, the second shaft being offset from and extending parallel to the longitudinal axis of the rod, the second shaft is adapted to cause the plurality of rollers to rotate about the central rod in unison.

7. The conveyor system of claim 5, wherein each of the plurality of rollers is made of ultra-high molecular weight plastic, wherein each of the plurality of rollers has a center passageway that directly contacts an outer surface of the central rod.

8. The conveyor system of claim 5, wherein each of the plurality of rollers is made of a high density polyethylene, wherein each of the plurality of rollers has a center passageway that directly contacts an outer surface of the central rod.

9. A roller assembly for use in a conveyor system comprising:
- a central rod having first and seconds ends and a longitudinal axis;
- a plurality of rollers rotatably mounted to the central rod such that adjacent rollers abut each other;
- a first shaft extending through each of the plurality of rollers, the first shaft being offset from and extending parallel to the longitudinal axis of the central rod, whereby the first shaft is adapted to cause the plurality of rollers to rotate about the central rod in unison; and
- a first collar and a second collar mounted on respective first and second ends the central rod, each collar being selectably movable along the central rod so as to hold the plurality of rollers in a fixed position along a length of the central rod,
- wherein at least one of the plurality of rollers has a center passageway with a first portion having a first diameter and a second portion having a second diameter, wherein the first diameter is configured such that the first portion of the center passageway contacts an outer surface of the central rod, and wherein the second diameter is greater than a diameter of the central rod such that there is a gap between the second portion of the center passageway and the outer surface of the central rod.

10. A conveyor system comprising;
- a conveyor section configured to transport items in a machine direction MD, the conveyor section includes a singulator including a plurality of roller assemblies, each roller assembly including:
  - a central rod having first and seconds ends and a longitudinal axis, the longitudinal axis of the central rod being angled relative to the machine direction MD of the conveyor section;
  - a plurality of rollers rotatably mounted to the central rod such that adjacent rollers abut each other;
  - a first shaft extending through each of the plurality of rollers, the first shaft being offset from and extending parallel to the longitudinal axis of the central rod, whereby the first shaft is adapted to cause the plurality of rollers to rotate about the central rod in unison; and
  - a first collar and a second collar mounted on respective first and second ends the central rod, each collar being selectably movable to the central rod so as to hold the plurality of rollers in a fixed position along a length of the central rod,
- wherein at least one of the plurality of rollers has a center passageway with a first portion having a first diameter and a second portion having a second diameter, wherein the first diameter is configured such that the first portion of the center passageway contacts an outer surface of the central rod, and wherein the second diameter is greater than a diameter of the central rod such that there is a gap between the second portion of the center passageway and the outer surface of the central rod.

* * * * *